United States Patent [19]
Kue

[11] Patent Number: 5,975,821
[45] Date of Patent: *Nov. 2, 1999

[54] FASTENER MODULE

[76] Inventor: J. F. Kue, 2, Lane 343, Cherng Gong Rd., Feng Yuan, Taiwan

[ * ] Notice: This patent is subject to a terminal disclaimer.

[21] Appl. No.: 08/927,153

[22] Filed: Aug. 29, 1997

[51] Int. Cl.⁶ ................................................. F16B 43/00
[52] U.S. Cl. ............................................ 411/533; 411/526
[58] Field of Search ................................. 411/533, 526, 411/371, 372

[56] References Cited

U.S. PATENT DOCUMENTS

| | | | |
|---|---|---|---|
| 1,037,010 | 8/1912 | Irons | 411/526 |
| 1,988,595 | 1/1935 | Hiss | 411/353 |
| 3,643,987 | 2/1972 | DuPont | 411/526 |
| 5,112,176 | 5/1992 | McCauley | 411/533 |
| 5,308,285 | 5/1994 | Malen | 411/533 |
| 5,618,145 | 4/1997 | Kuo | 411/533 |

FOREIGN PATENT DOCUMENTS 581645  12/1924  France ................................ 411/533

*Primary Examiner*—Flemming Saether
*Attorney, Agent, or Firm*—A & J

[57] ABSTRACT

A threaded fastener has a nut, a lower neck disposed on a bottom of the nut, a cage recess formed on the lower neck, the cage recess having a flat face and a bevel face, a cushion having a through hole, and the lower neck inserted in the through hole. The cushion encloses the cage recess.

1 Claim, 4 Drawing Sheets

FASTENER MODULE

BACKGROUND OF THE INVENTION

The present invention relates to a fastener module. More particularly, the present invention relates to a fastener module which will not damage a surface of a fastened article.

A conventional nut and a cushion are separated. The user may fasten the nut too tight. Therefore, the cushion may be deformed and a surface of a fastened article may be damaged.

SUMMARY OF THE INVENTION

An object of the present invention is to provide a fastener module which will not damage a surface of a fastened article.

In accordance with a first embodiment of the present invention, a fastener module comprises a nut, a lower neck disposed on a bottom of the nut, an annular projection formed on the lower neck, the annular projection having a flat face and a bevel face, a cushion having a through hole, and the lower neck inserted in the through hole. The cushion encloses the annular projection.

In accordance with a second embodiment of the present invention, a fastener module comprises a bolt head, a bolt neck, a bolt shank, and a cushion enclosing the bolt neck.

In accordance with a third embodiment of the present invention, a third fastener module comprises a nut, a lower neck disposed on a bottom of the nut, an annular projection formed on the lower neck, the annular projection having a flat face and a bevel face, an inclined face disposed on a bottom of the lower neck, a cushion having a through hole, and the lower neck inserted in the through hole. The cushion encloses the annual projection. An elastic retaining ring encloses the annular projection. The elastic retaining ring has a plurality of inclined protrusions inserted in the annular projection.

In accordance with a fourth embodiment of the present invention, a fastener module comprises a bolt head, a bolt neck, a bolt shank, a cushion enclosing the bolt neck, an annular recess formed on the bolt neck, an elastic retaining ring enclosing the annular recess, and the cushion enclosing the bolt neck.

In accordance with a fifth embodiment of the present invention, fastener module comprises a nut, a lower neck disposed on a bottom of the nut, a cushion enclosing the lower neck, and an elastic plate disposed between the nut and the cushion.

DETAILED DESCRIPTION OF THE INVENTION

Figure 1:
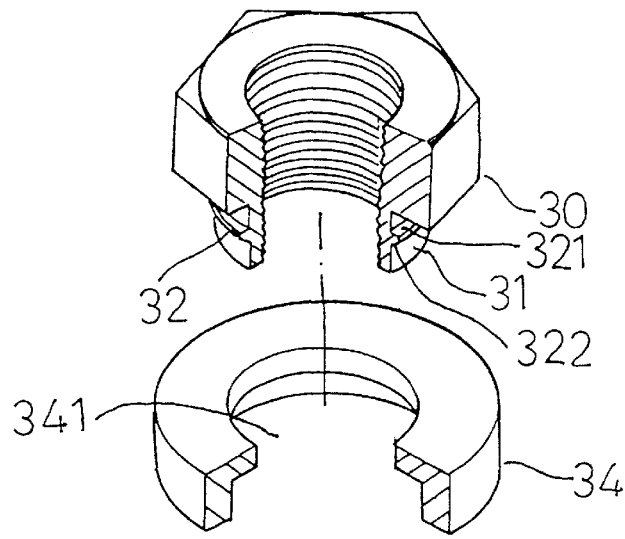
FIG. 1 is a perspective exploded view of a fastener module of a first preferred embodiment in accordance with the present invention.
Figures 2, 3:
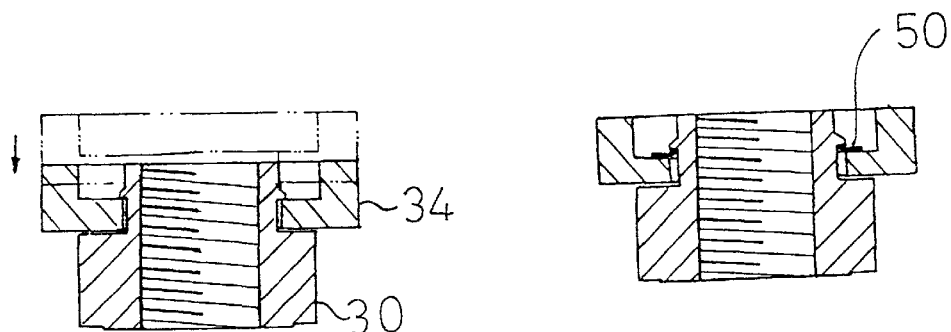
FIG. 2 is a sectional assembly view of a fastener module of a first preferred embodiment in accordance with the present invention.
FIG. 3 is a sectional assembly view of a fastener module of a first preferred embodiment and an elastic retaining ring.

Referring to FIGS. 1 and 2, a first threaded fastener comprises a nut 30, a lower neck 31 disposed on a bottom of the nut 30, an annular projection 32 formed on the lower neck 31, the annular projection 32 having a flat face 321 and a bevel face 322, a cushion 34 having a through hole 341, and the lower neck 31 inserted in the through hole 341. The cushion 34 encloses the annular projection 32. Referring to FIG. 3, it is an option to provide an elastic retaining ring 50 enclosing the annular projection 32.

Figures 4, 5:
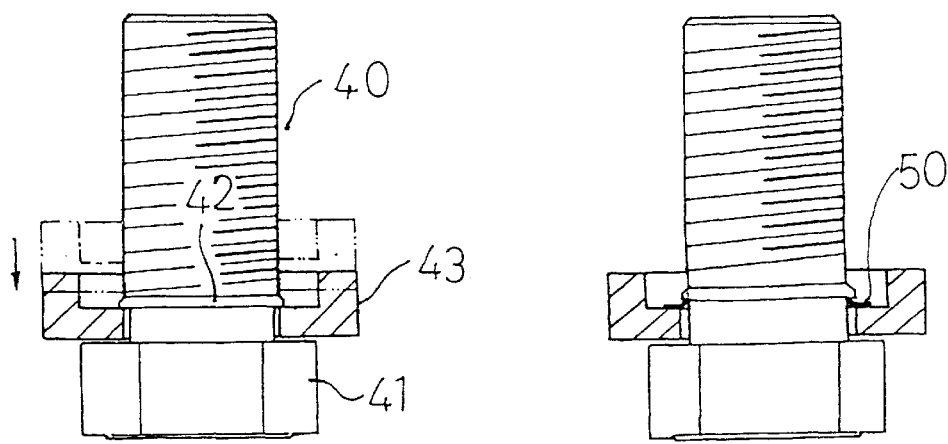
FIG. 4 is a sectional assembly view of a fastener module of a second preferred embodiment in accordance with the present invention.
FIG. 5 is a sectional assembly view of a fastener module of a second preferred embodiment and an elastic retaining ring.

Referring to FIG. 4, a second fastener module comprises a bolt head 41, a bolt neck 42, a bolt shank 40, and a cushion 43 enclosing the bolt neck 42. Referring to FIG. 5, it is an option to provide an elastic retaining ring 50 enclosing the bolt neck 42.

Figure 6:
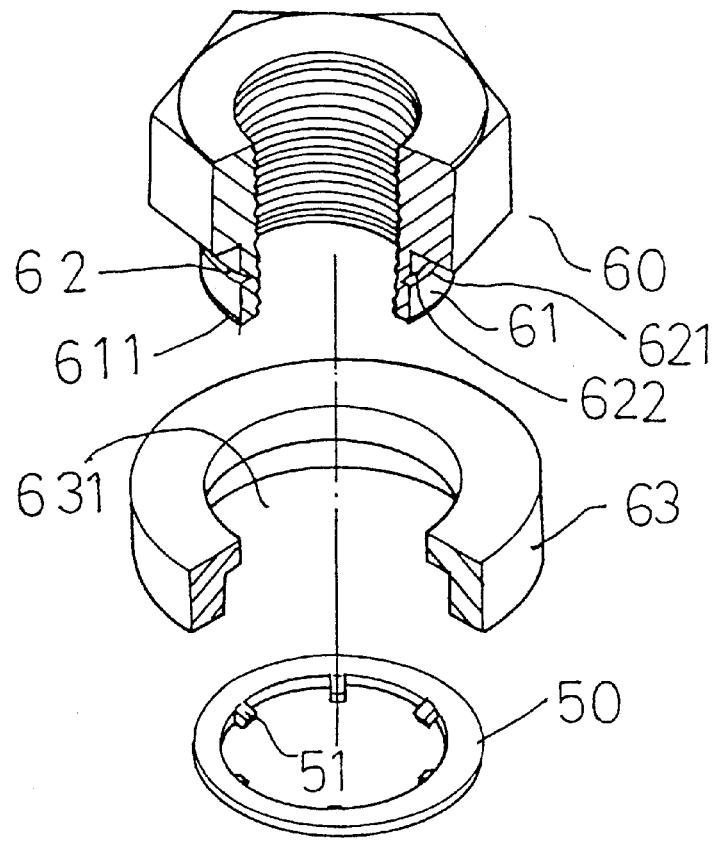
FIG. 6 is a perspective exploded view of a fastener module of a third preferred embodiment in accordance with the present invention.
Figure 7:
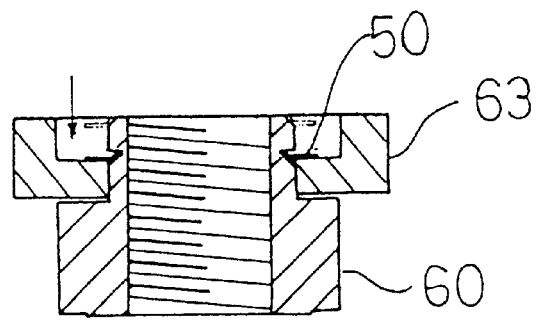
FIG. 7 is a sectional assembly view of a fastener module of a third preferred embodiment in accordance with the present invention.

Referring to FIGS. 6 and 7, a third threaded fastener comprises a nut 60, a lower neck 61 disposed on a bottom of the nut 60, a cage recess 62 formed on the lower neck 61, the cage recess 62 having a flat face 621 and a bevel face 622, an inclined face 611 disposed on a bottom of the lower neck 61, a cushion 63 having a through hole 631, and the lower neck 61 inserted in the through hole 631. The cushion 63 encloses the cage recess 62. An elastic retaining ring 50 encloses the cage recess 62. The elastic retaining ring 50 has a plurality of inclined protrusions 51 inserted in the cage recess 62.

Figure 8:
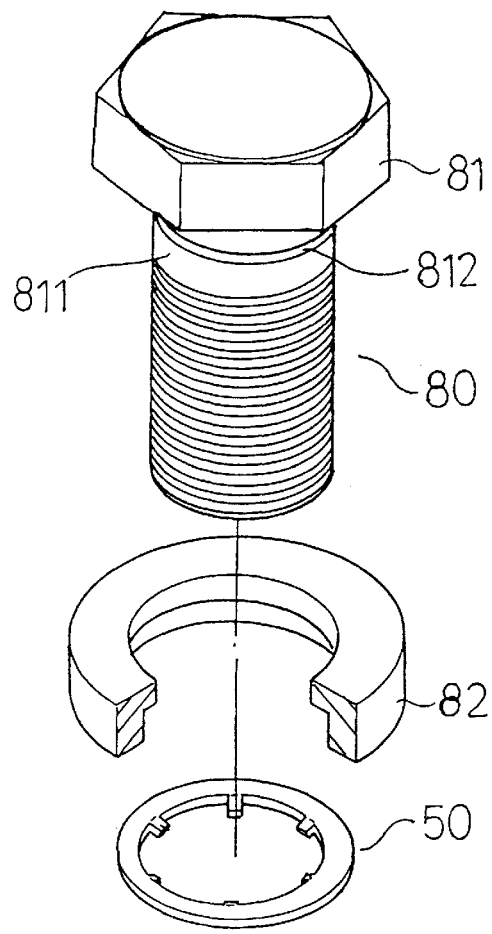
FIG. 8 is a perspective exploded view of a fastener module of a fourth preferred embodiment in accordance with the present invention.
Figure 9:
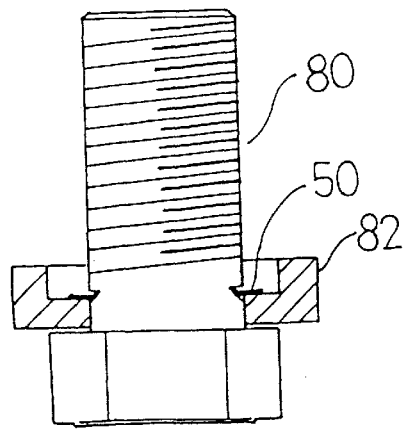
FIG. 9 is a sectional assembly view of a fastener module of a fourth preferred embodiment in accordance with the present invention.

Referring to FIGS. 8 and 9, a fourth fastener module comprises a bolt head 81, a bolt neck 811, a bolt shank 80, a cushion 82 enclosing the bolt neck 811, an annular recess 812 formed on the bolt neck 811, an elastic retaining ring 50 enclosing the annular recess 812, and the cushion 82 enclosing the bolt neck 42.

Figure 10:
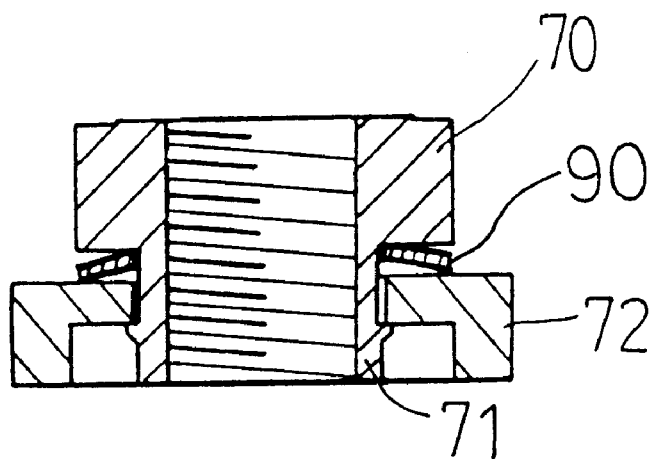
FIG. 10 is a sectional assembly view of a threaded fastener of a fifth preferred embodiment in accordance with the present invention.

Referring to FIG. 10, a fifth threaded fastener comprises a nut 70, a lower neck 71 disposed on a bottom of the nut 70, a cushion 72 enclosing the lower neck 71, and an elastic plate 90 disposed between the nut 70 and the cushion 72.

Figure 11:
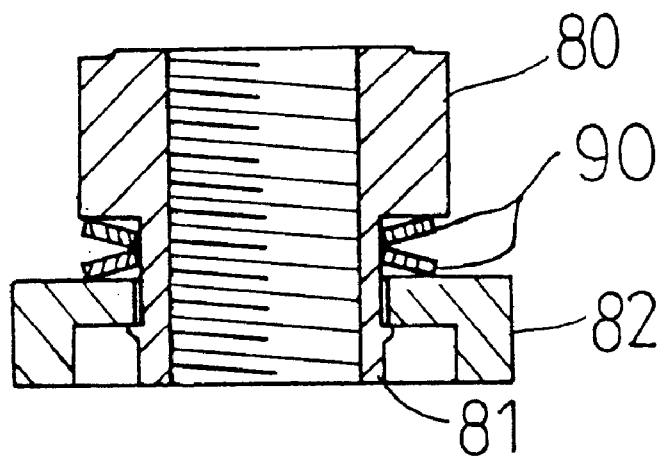
FIG. 11 is a sectional assembly view of a fastener module of a sixth preferred embodiment in accordance with the present invention.

Referring to FIG. 11, a sixth fastener module comprises a nut 80, a lower neck 81 disposed on a bottom of the nut 80, a cushion 82 enclosing the lower neck 81, and a plurality of elastic plates 90 disposed between the nut 80 and the cushion 82.

The fastener module of the present invention can impact-press a nut and a cushion in a single piece.

The invention is not limited to the above embodiment but various modification thereof may be made. Further, various changes in form and detail may be made without departing from the scope of the invention.

I claim:

1. A fastener module comprising;

a cushion having an upper upper with a first passage defined therein and-a lower portion having a second passage defined therein and communicating with said first passage, thereby forming a through passage, said second passage having a diameter greater than that of said first passage;

a nut mounted on an upper portion of said cushion and having a lower neck extending downwardly from a lower portion thereof which is mounted in said first passage, an annular projection defined along a periphery of an intermediate portion of said lower neck and positioned in said first passage, said annular projection having a flat surface at an upper side thereof and a bevel surface at a lower side thereof; and an elastic retainer ring mounted on maid lower neck and bearing between said flat surface of said annular projection and said cushion, said elastic retainer ring being provided with a plurality of inclined protrusions.

* * * * *